United States Patent Office 3,409,677
Patented Nov. 5, 1968

3,409,677
POLYPHENYL ETHER TREATMENT
Charles P. Duncker, Brentwood, and John F. Quinn, Kirkwood, Mo., assignors to Monsanto Company, St. Louis, Mo., a corporation of Delaware
No Drawing. Continuation-in-part of application Ser. No. 300,635, Aug. 7, 1963. This application Jan. 16, 1967, Ser. No. 609,351
5 Claims. (Cl. 260—613)

ABSTRACT OF THE DISCLOSURE

This invention describes a process for improving the oxidative stability of polyphenyl ethers subsequent to conventional manufacturing purification by contacting a polyphenyl ether with a macroreticular anion exchange resin. The present process also further improves conventionally purified polyphenyl ethers that have been subjected to contact with alumina or have stabilizers such as tetraphenyl tin added thereto.

---

This application is a continuation-in-part of application Ser. No. 300,635, filed Aug. 7, 1963, now abandoned.

This invention relates to the treatment of polyphenyl ethers. More particularly, this invention is concerned with improving the oxidative stability of polyphenyl ethers.

In recent years, polyphenyl ethers have found wide application as high-temperature lubricants and/or coolants. However, as temperature requirements increased, the heretofore available polyphenyl ethers exhibited a shortened useful life due to accelerated oxidation which decreases the lubrication and/or heat transfer characteristics. This tendency to deteriorate rapidly at elevated temperatures is a distinct disadvantage of the heretofore available polyphenyl ethers.

According to the present invention, the oxidative stability of a polyphenyl ether at elevated temperatures is enhanced to an unexpected degree by subjecting an otherwise purified and substantially neutral liquid polyphenyl ether to an anion exchange resin treatment in a non-aqueous system.

It is therefore an object of this invention to provide a method for improving the oxidative stability of polyphenyl ethers.

Other objects and advantages of this invention will become apparent by consideration of the following specification.

Polyphenyl ethers are generally prepared by the Ullman ether synthesis, which broadly relates to ether-forming reactions, e.g., alkali metal phenoxides, such as sodium and potassium phenoxides, with aromatic halides, such as bromobenzene, in the presence of a copper catalyst, such as metallic copper, copper hydroxides or copper salts. Other techniques are also known and employed for preparing polyphenyl ethers. The polyphenyl ethers thus formed have the following structure:

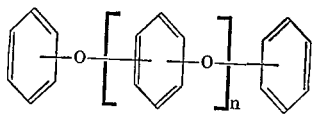

where $n$ is an integer from 1 to 5.

The preferred polyphenyl ethers are those having all of their linkages in the meta position for reasons well known. Examples of polyphenyl ethers contemplated herein are 3-ring ethers, such as m-diphenoxybenzene; 4-ring ethers, such as bis(m-phenoxybenzene) ether; 5-ring ethers, such as bis(phenoxyphenoxy) benzene; 6-ring ethers, such as bis[m-(m-phenoxyphenoxy)phenyl]-ether; and the 7-ring ethers, such as m-bis[(m-phenoxyphenoxy)phenoxy]benzene.

It is also contemplated that mixtures of such polyphenyl ethers can be stabilized by the process of this invention. For example, mixtures of polyphenyl ethers, in which the non-terminal phenylene rings are linked through oxygen atoms in the meta or para positions, have been found to be particularly suitable as lubricants because such mixtures possess fairly low solidification points and thus provide lubricating compositions having wider liquid ranges. An example of a preferred polyphenyl ether mixture is the mixture of 5-ring polyphenyl ethers in which the non-terminal phenylene rings are linked through oxygen atoms in the meta and para positions, and which is composed, by weight, of about 65% m-bis(m-phenoxyphenoxy)benzene, 30% m-[(m-phenoxyphenoxy) (p-phenoxyphenoxy)]benzene, and 5% m-bis(p-phenoxyphenoxy)benzene.

In carrying out the present invention, the conventionally purified product obtained from the foregoing synthesis being substantially neutral, that is, a pH of about 7, is contacted with an anion exchange resin prepared for a non-aqueous liquid system. Preferably, but not necessarily, the contact between the anion exchange resin and the polyphenyl ether comprises passing the polyphenyl ether through a bed or column of anion exchange resin prepared for a non-aqueous liquid system and which is regenerated in a conventional manner utilizing a non-aqueous solvent. While many non-aqueous solvents can be utilized, the preferred solvent is methanol.

It is to be noted that the liquid ethers of this invention are substantially neutral, that is, the synthesis products are conventionally purified to remove starting materials and side reaction products and thus display a pH of approximately 7.

The anion exchange resin selected is preferably a resin which is virtually inert to aliphatic and aromatic compounds such as alcohols, ethers, and other common solvents; has good resistance to swelling and contraction, that is, resistance to osmatic shock during the exhaustion and regeneration cycle; and possesses a highly porous body providing a very large surface area (hereinafter referred to as a "macroreticular" structure).

Resins having the aforesaid properties can be prepared by forming copolymers from monoethylenically unsaturated monomers and polyvinyl monomers in the presence of solvents which exert solvent action on the reactants (monomers), but essentially no solvent action on the product (copolymer).

The determination of suitable solvents and the amounts of monomers and solvents required for the formation of a particular copolymer with macroreticular structure may vary from case to case because of the numerous factors involved. However, although there is no single class of solvent applicable to all cases, it is relatively simple to determine a suitable solvent in a given situation. The requirements of solubility with the monomer mixture, and low or non-solubility with the copolymer, can be tested empirically. Further, the solubilities of many monomers and copolymers are well known from publications and text books.

Specifically, a suitable macroreticular copolymer can be prepared by admixing styrene and divinylbenzene in a suitable solvent. The amount of divinylbenzene can vary from about 6 to 55%, preferably from about 10 to 25%, based on the weight of the monomer mixture. It is desirable that a minimum amount of any particular solvent be utilized in order to effect phase separation, and such amount will generally range from about 30 to 60% of the total weight of monomer mixture and solvent. Suitable solvents include the alkanols having from 4 to 10 carbon atoms (e.g., n-butanol, sec-butanol, tert-amyl alcohol, n-hexanol, etc.), higher saturated aliphatic hydrocarbons (e.g., heptane, iso-octane, etc.), and other solvents that satisfy the aforesaid requirements.

The resin thus prepared in a cross-linked copolymer, the degree of cross-linking varying with the polyvinylidene content, i.e., the degree of cross-linking increases with increasing polyvinylidene content, and provides a structure capable of having functional groups attached thereto. Such resins have known utility as catalysts and conventional ion exchange resins in aqueous and non-aqueous systems.

It is preferred to utilize the aforesaid cross-linked copolymer with basic functional groups attached thereto forming a base type anion exchange resin. Examples of suitable basic functional groups include hydroxy, tertiary amine, quaternary amine, and the like. The preferred macroreticular base type anion exchange resin is one having tertiary amine functional groups.

In order to demonstrate the unexpected oxidative stability imparted to the polyphenyl ethers treated according to this invention, oxidation tests were conducted utilizing polyphenyl ethers prior to and subsequent to a macroreticular anion exchange resin treatment. The major bench-scale method used for evaluating the procedure is given in MIL-L-9326A, according to which a lubricant to be tested is heated at a specified temperature in the presence of certain metals and oxygen, and the viscosity increase of the lubricant is determined. Additionally, information as to the corrosivity of a lubricant to metals can be obtained.

In carrying out the process of this invention, a resin bed is prepared for non-aqueous liquid operation, and the otherwise purified polyphenyl ether is dissolved in a suitable solvent, such as toluene, and passed therethrough. Samples of the polyphenyl ether are taken prior to and subsequent to the resin bed treatment. The temperature at which this resin treatment is conducted is essentially determined by the viscosity of the polyphenyl ether solution and the temperature at which the resin is affected, generally below about 125° C., and preferably from about 25° C. to 50° C. The polyphenyl ether is then separated utilizing conventional means.

These samples are tested according to the hereinafter described tests, and the viscosity changes are noted. Viscosity measurements were made according to ASTM Method D-445-53T using a Cannon-Fenske modified Ostwald viscosimeter. The percentage of viscosity increase was determined by taking the difference in viscosity of a composition before and after it was heated, dividing that difference by the original viscosity, and multiplying the quotient by 100. Thus, the oxidative stability improvement factor, that is, the percentage of viscosity decrease attributable to the resin treatment, can be readily ascertained.

Specifically, an individual 125 ml. sample of a polyphenyl ether is subjected to a temperature of 600° F. for 48 hours during which period air is bubbled therethrough at approximately 5 liters per hour. The viscosity of each sample after the oxidation step is compared with the viscosity of each sample prior to the oxidation step, and the increase is noted.

The following table sets forth the results of comparative tests performed on 125 ml. samples of polyphenyl ethers comprising essentially a mixture of 5-ring polyphenyl ethers having an approximate composition of about 65% m-bis(m-phenoxyphenoxy)benzene, about 30% m-[(m-phenoxyphenoxy) (p-phenoxyphenoxy)]-benzene, and about 5% m-bis(p-phenoxyphenoxy)benzene (small amount 6-, 4- and 3-ring polyphenyl ethers may also be present). The temperature of the resin bed and polyphenyl ether during treatment is 25° C. The volume of resin utilized is 75 cc., and the polyphenyl ether passes therethrough at approximately 3 ml. per minute.

TABLE

| Example | Viscosity Increase, Percent. Non-Ion Exchange Treated | Ion Exchange Treated | Improvement Factor, percent |
|---------|---------|---------|---------|
| I | 75.0 | 60.6 | 19 |
| II | 49.0 | 10.7 | 78 |
| III | 25.3 | 9.4 | 71 |

In Example I, the polyphenyl ether composition is a substantially neutral mixture of the commercially prepared compounds; Example II is the same as Example I with addition of 0.1% by weight of tetraphenyl tin; and Example III is the same as Example I, but the composition of Example I is subjected to a digestion step with activated alumina for from 1 to 3 hours and 0.1% by weight of tetraphenyl tin is thereafter added. Note that all the sample liquid ethers are substantially neutral.

Samples of the compositions of Examples I, II and III are tested for viscosity increase prior to the resin treatment. Other samples of the compositions of Examples I, II and III are subjected to the resin treatment of this invention and thereafter tested for viscosity increase. The results of these tests are shown in the table.

Other 3-, 4- and 5-ring polyphenyl ethers and mixtures of said polyphenyl ethers, with or without the oxidative stabilizing additives and/or other treatments, also display enhanced oxidative stability when subjected to the process according to the present invention.

While this invention has been described with respect to various specific examples and embodiments, it is understood that the invention is not limited to such examples and embodiments, and that it can be variously practiced within the scope of the following claims.

What is claimed is:

1. A process which comprises contacting a substantially neutral liquid polyphenyl ether with a macroreticular anion exchange resin in a non-aqueous system, said resin having attached thereto tertiary amine functional groups, for a time sufficient to improve the oxidative stability of the polyphenyl ether.

2. A process according to claim 1 wherein said polyphenyl ether is of the formula

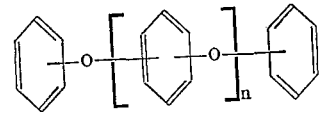

where $n$ is an integer from 1 to 5.

3. A process according to claim 1 wherein said polyphenyl ether contacts said resin at a temperature below about 125° C.

4. A process of claim 1 wherein said polyphenyl ether is a mixture of polyphenyl ethers composed, by weight, of about 65% m-bis(m-phenoxyphenoxy)benzene, 30% m-[(m-phenoxyphenoxy) (p-phenoxyphenoxy)]benzene, and 5% m-bis(p-phenoxyphenoxy)benzene.

5. A process of claim 1 wherein said macroreticular resin is a cross-linked styrene-polyvinylidene copolymer anion exchange resin having tertiary amine functional groups attached thereto and said polyphenyl ether contacts said resin at a temperature from about 25° to 50° C.

(References on following page)

References Cited

UNITED STATES PATENTS

| | | | |
|---|---|---|---|
| 2,160,911 | 6/1939 | Russell | 252—49.7 X |
| 2,211,558 | 8/1940 | Colin et al. | 252—49.7 |
| 3,231,499 | 1/1966 | Smith | 252—52 X |

FOREIGN PATENTS 886,978  1/1962  Great Britain.

OTHER REFERENCES

Heftmann: "Chromatography," published by Reinhold Publishing Corp., New York, 1961, pp. 34–35, 278–279, and 319, most pertinent.

Kunin et al.: "Ion Exchange Resins," 1950, p. 38, most pertinent.

PATRICK P. GARVIN, *Primary Examiner.*